United States Patent Office 2,838,500
Patented June 10, 1958

2,838,500

6-FLUORO STEROIDS

J Allan Campbell, Kalamazoo Township, Kalamazoo County, Raymond L. Pederson, Kalamazoo, John C. Babcock, Portage Township, Kalamazoo County, and John A. Hogg, Kalamazoo Township, Kalamazoo County, Mich., assignors to The Upjohn Company, Kalamazoo, Mich., a corporation of Michigan No Drawing. Application November 29, 1957
Serial No. 699,502

29 Claims. (Cl. 260—239.55)

The present invention relates to new steroids and is more particularly concerned with certain 6-fluoro-17β-hydroxy-17α-lower aliphatic hydrocarbon-4-androsten-3-ones (6-fluoro-17α-lower aliphatic hydrocarbon-testosterones), 6-fluoro-17β-hydroxy-17α-lower aliphatic hydrocarbon - 4 - (19 - norandrosten) - 3 - ones (6 - fluoro-17α-lower aliphatic hydrocarbon-19-nortestosterones), the 17-acylates thereof and novel steroid intermediates and methods used in the preparation thereof.

The novel end product compounds of this invention are represented by the formula:

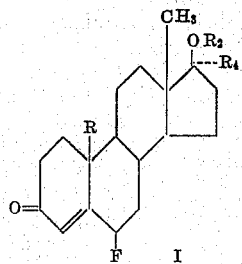

wherein R represents methyl or hydrogen, $R_2$ represents hydrogen or an acyl radical of an organic carboxylic acid, preferably a hydrocarbon carboxylic acid, containing from one to twelve carbon atoms, inclusive, and $R_4$ represents a lower aliphatic hydrocarbon radical. The term lower aliphatic hydrocarbon radical as used herein refers to an alkyl radical of from one to six carbon atoms, inclusive, e. g., methyl, ethyl, propyl, butyl, amyl, hexyl, isopropyl, and 3-methyl-pentyl, or an alkynyl radical of the structure —C≡CR$_3$, wherein $R_3$ is hydrogen or an alkyl radical of from one to four carbon atoms, inclusive, e. g., methyl, ethyl, propyl, isopropyl, butyl, isobutyl, and tertiary-butyl.

It is an object of the present invention to provide novel 6-fluoro-17β-hydroxy-17α-lower aliphatic hydrocarbon-4-androsten-3-ones and 6-fluoro-17β-hydroxy-17α-lower aliphatic hydrocarbon-4-(19-norandrosten)-3-ones, 17-acylates thereof, and novel intermediates and methods in the production thereof. Other objects will be apparent to those skilled in the art to which this invention pertains.

The 6-fluoro-17β-hydroxy-17α-lower aliphatic hydrocarbon - 4 - androsten - 3 - ones, 6 - fluoro - 17β - hydroxy-17α-lower aliphatic hydrocarbon-4-(19-norandrosten)-3-ones, and the 17-acylates thereof, represented by Formula I, are useful as starting materials for the production of other valuable compounds, represented by Formulas II, III, and IV, according to the following reaction sequence:

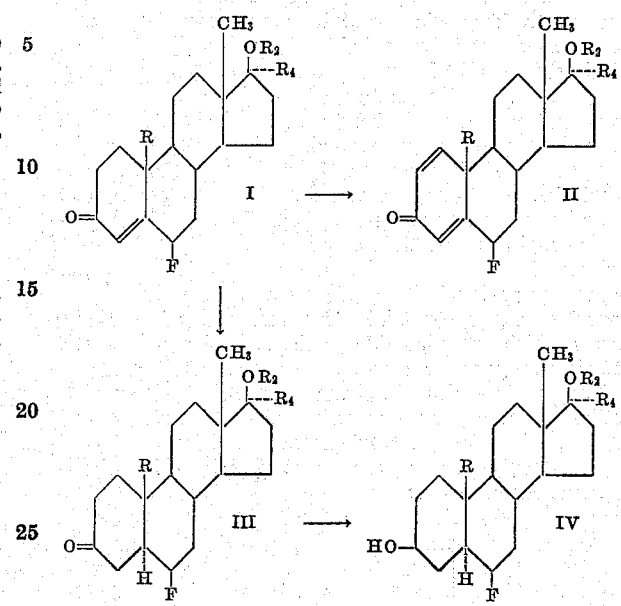

wherein R, $R_2$, and $R_4$ have the same meaning as given above.

The compounds represented by Formula II, for example, 6-fluoro-17β-hydroxy-17α-lower aliphatic hydrocarbon-1,4-androstadien-3-ones, can be obtained by the dehydrogenation of the corresponding starting compound of Formula I. The dehydrogenation can be carried out chemically using selenium dioxide, or biologically, using a fungus, such as *Septomyxa affinis*, A. T. C. C. 6737, in accordance with the procedure disclosed in Belgian Patent No. 545,877, or using *Fusarium solani*.

The conversion of the compounds of Formula I to the compounds of Formula III, for example, 6-fluoro-17β-hydroxy-17α-lower aliphatic hydrocarbon androstan-3-ones and 6-fluoro-17β-hydroxy-17α-lower aliphatic hydrocarbon-19-norandrostan-3-ones is accomplished by catalytic hydrogenation of the corresponding starting compound of Formula I using a noble metal, preferably palladium, as catalyst. The reaction can be carried out at atmospheric or higher pressures and in the presence of an organic solvent, such as ethyl acetate. The thus-obtained compounds of Formula III can then be treated with a metal borohydride, preferably an alkali metal borohydride, such as sodium borohydride, in the presence of an organic solvent, such as dioxane, at room temperature, to produce the compounds of Formula IV, such as 6-fluoro-3β,17β-dihydroxy-17α-lower aliphatic hydrocarbon androstanes and 6-fluoro-3β,17β-dihydroxy-17α-lower aliphatic hydrocarbon 19-norandrostanes.

The novel end products of this invention, the compounds of Formula I, possess useful therapeutic properties. The 6-fluoro substituted 17α-alkyl compounds are anabolic agents with improved therapeutic ratio. For example, orally administered 6α-fluoro-17β-hydroxy-17α-methyl-4-androsten-3-one (6α - fluoro-17-methyltestosterone) possesses marked anabolic activity and markedly lesser androgenic activity, having 2.25 times the anabolic activity and only 0.8 times the androgenic activity of orally administered 17β-hydroxy-17α-methyl-4-androsten-3-one (methyltestosterone). Subcutaneously administered 6α-fluoro-17β-hydroxy-17α-methyl - 4 - androsten-3-one possesses 38 percent of the anabolic activity and only fourteen percent of the androgenic activity of subcutaneously administered 17β-hydroxy-4-androsten-3-one 17-propionate (testosterone propionate). 6α-fluoro-17β-hydroxy-17α-ethinyl-4-androsten-3-one (6α-fluoro-17- ethinyltestosterone) and those other compounds of Formulas I, II, III, and IV possessing the 17α-C≡CR₃ grouping affect the secretion of gonadotropins and thus regulate ovulation and endometrial and placental development and, particularly when used in conjunction with estrogens, e. g., ethinylestradiol and/or androgens, e. g., "Halotestin" (9α-fluoro-11β-hydroxy - 17 - methyltestosterone), reduce fertility, and constitute effective therapy for dysmenorrhea, amenorrhea, endometriosis, threatened abortion and related gynocological disorders. When the compounds of Formulas II, III, and IV contain a 17α-alkyl side chain they possess the ability to modify the secretion of gonadotropins and in addition exhibit androgenic, anabolic and CNS-depressant activity. Administration of the steroids of Formulas I, II, III, and IV can be in conventional dosage forms such as pills, tablets, capsules, syrups, or elixirs for oral use, or in liquid forms which are adaptable to the natural and synthetic steroid hormones for injectable products.

The novel steroids of Formula I wherein $R_1$ is an alkyl radical of from one to six carbon atoms, inclusive, e. g., methyl, ethyl, propyl, butyl, amyl, hexyl, isopropyl, and 3-methylpentyl can be prepared according to the following reaction sequence:

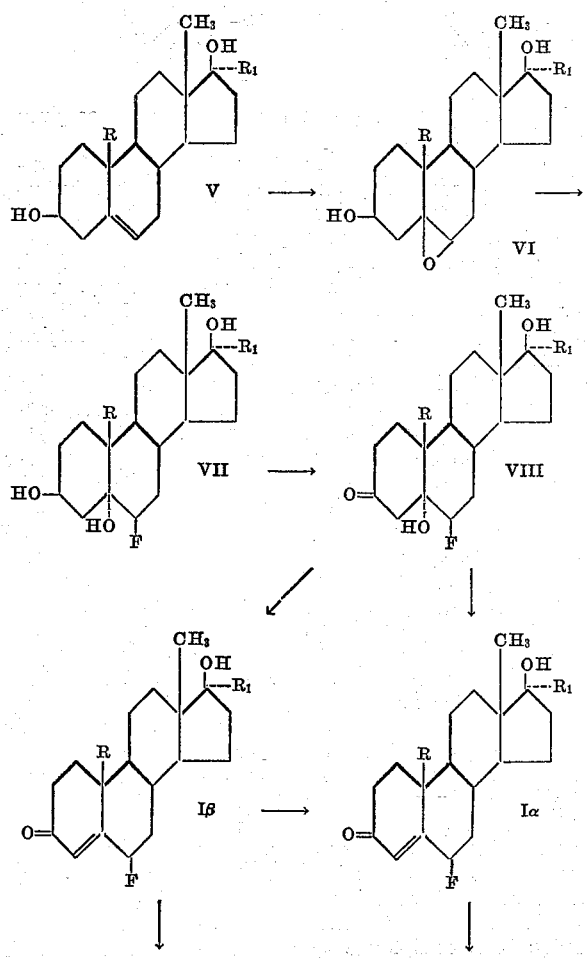

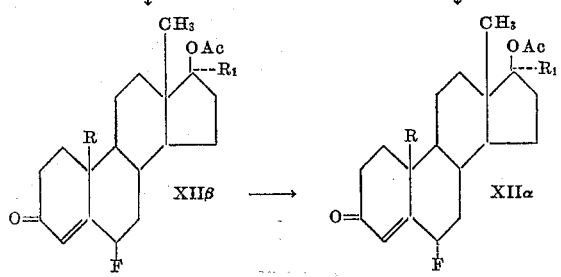

wherein R has the same meaning as previously given and Ac represents the acyl radical of an organic carboxylic acid, preferably a hydrocarbon carboxylic acid, containing from one to twelve carbon atoms, inclusive.

It is to be understood that in the reaction scheme depicted above and described in greater detail below in the body of the specification a radical of the structure —C≡CR₃, wherein R₃ is hydrogen or an alkyl radical of from one to four carbon atoms, inclusive, e. g., methyl, ethyl, propyl, isopropyl, butyl, isobutyl, and tertiary butyl, can be substituted for the alkyl radical represented by $R_1$, to produce the corresponding compounds having a —C≡CR₃ group, in the alpha position attached to the 17 carbon.

As indicated above and described in greater detail below, the reactions embodied in this method of the invention are susceptible of variation in the specific steps leading to the products, 6α-fluoro-17β-hydroxy-17α-alkyl-4-androsten-3-ones and 6α-fluoro-17β-hydroxy-17α-alkyl-4-(19-norandrosten)-3-ones, represented by Formula Iα, and 6β-fluoro-17β - hydroxy-17α-alkyl-4-androsten-3-ones and 6β-fluoro-17β-hydroxy-17α-alkyl-4 - (19 - norandrosten)-3-ones, represented by Formula Iβ (or if desired the 17-acylates of the compounds of Iα and Iβ, represented by Formulas XIIα and XIIβ, respectively), the precise sequence selected being determined by such factors as economics and convenience.

One of the processes of the present invention comprises allowing compounds of the type represented by Formula V, such as 3β,17β-dihydroxy-17α-alkyl-5-androstenes and 3β,17β-dihydroxy-17α-alkyl-5-(19-norandrostenes), to react with a peracid such as peracetic or perbenzoic acid to obtain the corresponding 5,6-epoxy compounds represented by Formula VI, such as 3β,17β-dihydroxy-17α-alkyl-5α,6α-epoxyandrostanes and 3β,17β-dihydroxy-17α-alkyl-5α,6α-epoxy-19-norandrostanes.

The thus-obtained compounds of Formula VI, such as the 5α,6α-epoxy compounds, are then treated with a fluorinating agent such as anhydrous hydrogen fluoride in the presence of an organic solvent, preferably a mixture of chloroform and tetrahydrofuran, to obtain the compounds of Formula VII, such as 6β-fluoro-3β,5α,17β-trihydroxy - 17α - alkylandrostanes and 6β-fluoro-3β,5α,17β-trihydroxy-17α-alkyl-19-norandrostanes.

The compounds of Formula VII are then oxidized, preferably in acetic acid solution, with an oxidizing agent, such as chromic anhydride or sodium dichromate, using a slight excess of the oxidizing agent. At the conclusion of the desired oxidation reaction, the chromic acid oxidant is preferably destroyed by addition of methyl alcohol, ethyl alcohol, and the like. Thereafter, the resulting compounds of Formula VIII, such as 6β - fluoro-5α,17β - dihydroxy - 17α - alkylandrostan - 3 - ones and 6β - fluoro - 5α,17β - dihydroxy - 17α - alkyl - 19 - norandrostan-3-ones are recovered by conventional means such as precipitation with water, dilution with water and extraction with a water-immiscible solvent, e. g., methylene chloride, benzene, ether, or the like, following by evaporation of the solvent.

The compounds of Formula VIII, such as 6β-fluoro-5α,17β - dihydroxy - 17α - alkylandrostan - 3 - ones and 6β - fluoro - 5α,17β - dihydroxy - 17α - alkyl - 19 - norandrostan-3-ones are then dehydrated, in the presence of an organic solvent, such as ethyl alcohol, with mild conditions using a base, such as sodium hydroxide. This reaction is productive of the compounds of Formula Iβ, such as 6β-fluoro-17β-hydroxy - 17α - alkyl - 4 - androsten-3-ones and 6β-fluoro-17β-hydroxy-17α-alkyl-4-(19-norandrosten)-3-ones.

The thus-obtained 6β-fluoro compounds are then isomerized to the corresponding 6α-fluoro compounds of Formula Iα, such as 6α-fluoro-17β-hydroxy-17α-alkyl-4-androsten-3-ones and 6α-fluoro-17β-hydroxy-17α-alkyl-4-(19-norandrosten) - 3 - ones by treating the 6β-fluoro compounds, at temperatures of zero degrees centigrade or slightly lower, in a liquid medium such as an organic solvent, for example, chloroform, methylene chloride, ether, and the like, and in the presence of a prototropic agent (a proton donating agent) such as water, alcohols, organic acids, and the like, with a mineral acid such as hydrochloric acid. The reaction mixture can then be washed with successive portions of dilute alkali, such as sodium bicarbonate, and water, and evaporated to obtain the 6α-fluoro compounds of Formula Iα.

Alternatively, the 6α-fluoro compounds of Formula Iα can be obtained directly from the compounds of Formula VIII by a combined dehydration, isomerization reaction. This reaction is carried out by treating the compounds of Formula VIII with a mineral acid such as hydrochloric acid. The reaction is carried out in a liquid medium such as an organic solvent, for example, chloroform, methylene chloride, ether, and the like, and in the presence of a prototropic agent (a proton donating agent), such as water, alcohols, and organic acids while maintaining the temperature at zero degrees centigrade or slightly lower. Advantageously, such temperatures should be maintained throughout the period of contact with the acid.

The 17-acylates represented by Formula XIIα and XIIβ are obtainable by allowing the compounds of Formulas Iα and Iβ, respectively, to react with the anhydride of an organic carboxylic acid, particularly a hydrocarbon carboxylic acid, containing from one to twelve carbons, inclusive, for example, a saturated straight-chain aliphatic acid, e. g., acetic, propionic, butyric, valeric, hexanoic, lauric, a saturated branched-chain aliphatic acid, e. g., trimethylacetic, isobutyric, isovaleric, a cycloaliphatic saturated acid, e. g., cyclohexane-carboxylic, an alkaryl acid, e. g., benzoic, phenylacetic, 2-phenylpropionic, o-, m-, and p-toluic, a saturated dibasic acid (which can be converted into water-soluble, e. g., sodium, salts), e. g., succinic, adipic, a monobasic unsaturated acid, e. g., acrylic, crotonic, undecylenic, propiolic, cinnamic, a dibasic unsaturated acid (which can be converted into water-soluble, e. g., sodium, salts), e. g., maleic and citraconic.

The 6β-fluoro compounds of Formula XIIβ can be converted to the corresponding 6α-fluoro compounds of Formula XIIα, such as 6α-fluoro-17β-hydroxy-17α-alkyl-4-androsten-3-one 17-acylates and 6α-fluoro-17β-hydroxy-17α-alkyl-4-(19-norandrosten)-3-one 17-acylates by the same method used to convert the compounds of Formula Iβ to the compounds of Formula Iα.

Alternatively, the compounds of Formula VIII can be produced according to the following reaction sequence:

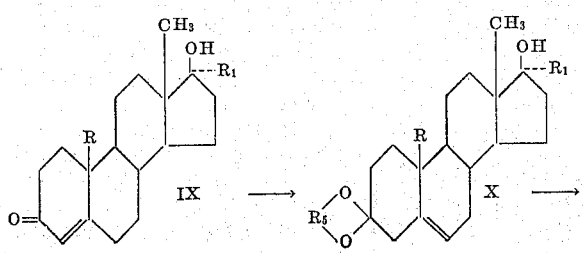

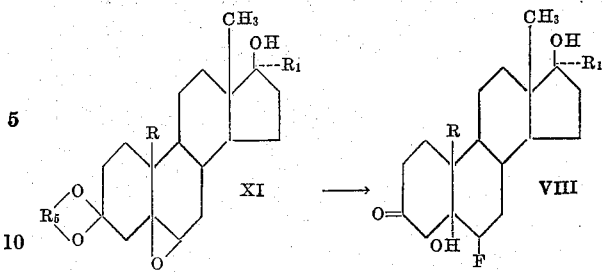

in which R and R₁ have the same meaning as previously given and R₅ is an alkylene radical containing not more than eight carbon atoms, inclusive, and the attaching oxygen to carbon bonds are separated by a chain of at least two and not more than three carbon atoms.

The obtention of the compounds of Formula VIII by the alternative route given above comprises treating the compounds of Formula IX, such as 17β-hydroxy-17α-alkyl - 4 - androsten - 3 - ones and 17β - hydroxy - 17α-alkyl-4-(19-norandrosten)-3-ones, with ethylene glycol, in the presence of a strong acid such as toluenesulfonic acid, orthochlorobenzenesulfonic acid, sulfuric acid, and the like, to produce the compounds of Formula X, such as 17β - hydroxy - 17α - alkyl - 5 - androsten - 3 - one 3-ethylene ketals and 17β-hydroxy-17α-alkyl-5-(19-norandrosten)-3-one 3-ethylene ketals. Similarly the compounds of Formula IX can be allowed to react with other 1,2-alkane diols or 1,3-alkane diols such as propylene glycol, butane-1,2-diol, butane-1,3-diol, pentane-1,2- and 1,3-diol, hexane-1,2- and 1,3-diol, heptane-1,2- and 1,3-diol, octane-1,2- and 1,3-diol, or other alkane diols of the formula:

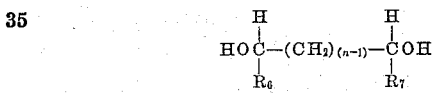

wherein $n$ is an integer having a value of from one to two, inclusive, and $R_6$ and $R_7$ each represent hydrogen or lower alkyl radicals containing up to six carbon atoms and wherein the total number of carbon atoms in the alkane diol is up to and including eight carbon atoms, to obtain the corresponding 3-alkylene ketals of Formula X.

The compounds of Formula X are then treated with a peracid, such as peracetic or perbenzoic acid, which is productive of the compounds of Formula XI, such as 17β - hydroxy - 17α - alkyl - 5α,6α - epoxyandrostan-3-one 3-ethylene ketals and 17β-hydroxy-17α-alkyl-5α,6α-epoxy-19 norandrostan-3-one 3-ethylene ketals. The thus-obtained compounds of Formula XI can then be treated with hydrogen fluoride to obtain the compounds represented by Formula VIII, such as 6β-fluoro-5α,17β-dihydroxy - 17α - alkylandrostan - 3 - ones and 6β - fluoro-5α,17β-dihydroxy-17α-alkyl-19-norandrostan-3-ones.

The following examples are illustrative of the process and products of the present invention, but are not to be construed as limiting.

EXAMPLE 1

A. *3β,17β-dihydroxy-17α-methyl-5α,6α-epoxyandrostane (compound VIa)*

32 grams of 3β,17β-dihydroxy-17α-methyl-5-androstene, compound Va, and four grams of sodium acetate were dissolved in 1000 milliliters of chloroform and cooled to fifteen degrees centigrade. To the thus-obtained solution there was added, over a five minute period, forty milliliters of forty percent peracetic acid whilst stirring and cooling. The reaction mixture was allowed to stand for thirty minutes and then warmed to about 25 degrees centigrade. After three hours, 500 milliliters of water was added thereto. The mixture was then filtered to recover the precipitate contained therein. The precipitate was washed with water and dried to yield 23.45 grams of 3β,17β-dihydroxy-17α-methyl-5α,6α-epoxyandrostane, compound VIa, melting at 253–255 degrees centigrade and having an [α]$_D$ minus 65 degrees (0.89%, pyridine).

B. 6β-fluoro-3β,5α,17β-trihydroxy-17α-methylandrostane (compound VIIa)

13.2 grams of anhydrous hydrogen fluoride was condensed in a 100-milliliter polyethylene bottle using a dry ice-cooling bath. Forty milliliters of precooled chloroform was then added, followed by the cautious addition of 24 milliliters of tetrahydrofuran. To this cold solution there was then added nine grams of compound VIa. The reaction mixture thus obtained was warmed to about minus fifteen degrees centigrade for three and one-half hours and then poured slowly into 900 milliliters of ice water containing sixty grams of sodium bicarbonate. To the aqueous mixture there was then added 300 milliliters of methylene chloride. The mixture was shaken and upon standing an aqueous and a methylene chloride layer separated. The methylene chloride layer was drawn off and saved. The aqueous layer was filtered and the filtrate obtained was extracted with another 300-milliliter portion of methylene chloride. The extraction procedure was repeated a third time using another 300-milliliter portion of methylene chloride. The methylene chloride extracts obtained in the three extractions were then combined, washed with water, dried and evaporated to a solid residue. Recrystallization from acetone gave 3.1 grams of 6β-fluoro-3β,5α,17β-trihydroxy-17α-methylandrostane, compound VIIa, melting at 230–232 degrees centigrade and having an [α]$_D$ minus 26 degrees (0.96%, pyridine).

*Analysis.*—Calcd. for $C_{20}H_{33}FO_3$: F, 5.58. Found: F, 5.06.

C. 6β-fluoro-5α,17β-dihydroxy-17α-methylandrostan-3-one (compound VIIIa)

To an ice-bath-cooled solution of 2.82 grams of chromic anhydride, 118 milliliters of acetic acid and three milliliters of water, there was added, whilst stirring and cooling, 7.9 grams of compound VIIa. After standing for fifteen minutes, the reaction mixture was warmed to about 25 degrees centigrade and allowed to stand for two and one-half hours. To the reaction mixture there was then added ten milliliters of methyl alcohol and 300 milliliters of water, the addition of the latter causing a solid to precipitate. The precipitate was collected and washed with water to give 4.9 grams of crude compound VIIIa, one gram of which was recrystallized from acetone-Skellysolve B hexanes to give 0.51 grams of 6β-fluoro-5α,17β-dihydroxy-17α-methylandrostan-3-one, comcompound VIIIa, melting at 239–241 degrees centigrade and having an [α]$_D$ minus ten degrees (0.86%, CHCl$_3$).

*Analysis.*—Calcd. for $C_{20}H_{31}FO_3$: C, 70.97; H, 9.23; F, 5.61. Found: C, 70.61; H, 9.22; F, 6.20.

D. 6β-fluoro-17β-hydroxy-17α-methyl-4-androsten-3-one (6β-fluoro-17 methyltestosterone) (compound Iβa)

11.3 grams of compound VIIIa were dissolved in 350 milliliters of absolute ethyl alcohol and cooled to fifteen degrees centigrade. Forty milliliters of 0.1 N sodium hydroxide were then added to the solution which was then cooled to five degrees centigrade. After standing at five degrees centigrade for sixteen hours the solution was neutralized with four milliliters of acetic acid and concentrated at reduced pressure until crystallization of unreacted compound VIIIa began. The mixture was chilled and filtered to collect the precipitate of compound VIIIa which had formed. The filtrate was retained. The precipitate was then recrystallized from acetone and filtered to give five grams of compound VIIIa. The acetone filtrate was combined with the first obtained filtrate and concentrated to a dry residue which was then dissolved in methylene chloride. The thus-obtained solution was then absorbed on 200 grams of synthetic magnesium silicate (Florisil) and eluted, using 200-milliliter fractions, as follows:

Fractions 1–9—acetone:Skellysolve B hexanes::4:96
Fractions 10–25—acetone:Skellysolve B hexanes::5:95

Fractions 10–22 were combined and crystallized to give 2.26 grams of material. Recrystallization from acetone gave 2.02 grams of 6β-fluoro-17β-hydroxy-17α-methyl-4-androsten-3-one, compound Iβa; melting point 164–165 degrees centigrade, [α]$_D$ minus 28 degrees (0.985%, CHCl$_3$, $\lambda_{max.}^{alc.}$ 235 mμ (log $a_M$ 4.09).

*Analysis.*—Calcd. for $C_{20}H_{29}FO_2$: C, 74.96; H, 9.12; F, 5.93. Found: C, 75.15; H, 9.31; F, 5.64.

E. 6α-fluoro-17β-hydroxy-17α-methyl-4-androsten-3-one (6α-fluoro-17-methyltestosterone) (compound Iαa)

A solution containing 1.1 grams of compound Iβa dissolved in twenty milliliters of reagent grade chloroform (containing traces of alcohol) was cooled to minus ten degrees centigrade. Anhydrous hydrogen chloride was passed through the solution for forty minutes, whilst cooling in an ice-salt bath, followed by a stream of nitrogen for twenty minutes. The solution was then washed with a cold five percent sodium bicarbonate solution and water, dried over sodium sulfate and evaporated to a residue. Crystallization from acetone-Skellysolve B hexanes gave 0.31 gram of 6α-fluoro-17β-hydroxy-17α-methyl-4-androsten-3-one, compound Iαa; melting point 155–157 degrees centigrade (melting point on admixture with the 6β-isomer, compound Iβa, was depressed to 133–135 degrees centigrade), $\lambda_{max.}^{alc.}$ 237 mμ (log $a_M$ 4.13).

*Analysis.*—Calcd. for $C_{20}H_{29}FO_2$: C, 74.96; H, 9.12; F, 5.93. Found: C, 74.01; H, 9.03; F, 5.77.

F. 6α-fluoro-17β-hydroxy-17α-methyl-4-androsten-3-one 17-acetate (6α-fluoro-17-methyltestosterone acetate) (compound XIIαa)

One gram of compound Iαa was dissolved in nine milliliters of acetic anhydride and warmed under reflux for one-half hour. The reaction mixture was then distilled under reduced pressure to remove unreacted acetic anhydride. The crystalline material, 6α-fluoro-17β-hydroxy-17α-methyl-4-androsten-3-one 17-acetate, compound XIIαa, remaining after the distillation was then recrystallized from aqueous methanol.

Similarly, by reacting compound Iαa with the appropriate hydrocarbon carboxylic acid anhydride, for example, at temperatures between 120 and 150 degrees centigrade, there are produced other 17-acylates of 6α-fluoro-17β-hydroxy-17α-methyl-4-androsten-3-one such as 6α-fluoro-17β-hydroxy-17α-methyl-4-androsten-3-one 17-propionate, 6α-fluoro-17β-hydroxy-17α-methyl-4-androsten-3-one 17-butyrate, 6α-fluoro-17β-hydroxy-17α-methyl-4-androsten-3-one 17-valerate, 6α-fluoro-17β-hydroxy-17α-methyl-4-androsten-3-one 17-hexanoate, 6α-fluoro-17β-hydroxy-17α-methyl-4-androsten-3-one 17-laurate, 6α-fluoro-17β-hydroxy-17α-methyl-4-androsten-3-one 17-trimethylacetate, 6α-fluoro-17β-hydroxy-17α-methyl-4-androsten-3-one 17-isobutyrate, 6α-fluoro-17β-hydroxy-17α-methyl-4-androsten-3-one 17-isovalerate, 6α-fluoro-17β-hydroxy-17α-methyl-4-androsten-3-one 17-cyclohexanecarboxylate, 6α-fluoro-17β-hydroxy-17α-methyl-4-androsten-3-one 17-benzoate, 6α-fluoro-17β-hydroxy-17α-methyl-4-androsten-3-one 17-phenylacetate, 6α-fluoro-17β-hydroxy-17α-methyl-4-androsten-3-one 17-(β-phenylpropionate), 6α-fluoro-17β-hydroxy-17α-methyl-4-androsten-3-one 17-(o-, m-, p-toluate), 6α-fluoro-17β-hydroxy-17α-methyl-4-androsten-3-one 17-hemisuccinate, 6α-fluoro-17β-hydroxy-17α-methyl-4-androsten-3-one 17-hemiadipate, 6α-fluoro-17β-hydroxy-17α-methyl-4-androsten-3-one 17-acrylate, 6α-fluoro-17β-hydroxy-17α-methyl-4-androsten-3-one 17-crotonate, 6α-fluoro-17β-hydroxy-17α-methyl-4-androsten-3-one 17-undecylenate, 6α-fluoro-17β-hydroxy-17α-methyl-4-androsten-3-one 17-propionate.

6α-fluoro-17β-hydroxy-17α-methyl-4-androsten-3-one 17-cinnamate, 6α-fluoro-17β-hydroxy-17α-methyl-4-androsten-3-one 17-maleate, and 6α-fluoro-17β-hydroxy-17α-methyl-4-androsten-3-one 17-citraconate.

Similarly, 6β-fluoro-17β-hydroxy-17α-methyl-4-androsten-3-one, compound Iβa, is reacted with acetic anhydride to obtain the corresponding 17-acetate, compound XIIβa, which is then converted to 6α-fluoro-17β-hydroxy-17α-methyl-4-androsten-3-one 17-acetate, compound XIIαa, using the procedure set forth in Example 1, part E.

Substituting a stoichiometric equivalent of 3β,17β-dihydroxy-17α-ethyl-5-androstene as the starting material in place of 3β,17β-dihydroxy-17α-methyl-5-androstene and following the procedure of Example 1, there is produced, in consecutive order, 3β,17β-dihydroxy-17α-ethyl-5α,6α-epoxyandrostane (part A), 6β-fluoro-3β,5α,17β-trihydroxy-17α-ethylandrostane (part B), 6β-fluoro-5α,17β-dihydroxy-17α-ethylandrostan-3-one (part C), 6β-fluoro-17β-hydroxy-17α-ethyl-4-androsten-3-one (part D), 6α-fluoro-17β-hydroxy-17α-ethyl-4-androsten-3-one (part E), and 6α-fluoro-17β-hydroxy-17α-ethyl-4-androsten-3-one 17-acetate.

EXAMPLE 2

*6α-fluoro-17β - hydroxy-17α - methyl - 4 - androsten-3-one (compound Iαa) directly from 6β-fluoro-5α,17β-dihydroxy-17α-methylandrostan-3-one (compound VIIIa)*

The procedure of Example 1, parts A through C, was followed to produce compound VIIIa, four grams of which were dissolved in 300 milliliters of reagent grade chloroform (containing traces of alcohol) and cooled to minus ten degrees centigrade. Anhydrous hydrogen chloride gas was bubbled through the solution for two and one-half hours whilst maintaining the temperature at minus ten degrees centigrade. The reaction mixture was then washed with water, cold five percent sodium bicarbonate solution and again with water. The washed reaction mixture was then dried over sodium sulfate, followed by distillation of the chloroform to give a residue. To the residue there was added eighty milliliters of methylene chloride and eighty milliliters of Skellysolve B hexanes to give a solution which was then adsorbed on 200 grams of Florisil, and eluted, using 230-milliliter fractions, as follows:

Fractions 1–16—acetone-Skellysolve B hexanes::5:95.
Fractions 17–30—acetone-Skellysolve B hexanes::6:94.

Fractions 14–30 were combined to give 2.42 grams of material. Recrystallization from methylene chloride and Skellysolve B hexanes gave 1.85 grams of 6α-fluoro-17β-hydroxy-17α-methyl-4-androsten-3-one, compound Iαa; melting point 161–163 degrees centigrade, [α]$_D$ plus 72 degrees (1.01%, CHCl$_3$), λ$_{max}^{alc.}$ 236.5 mμ (log ε 4.18).

*Analysis.*—Calcd. for C$_{20}$H$_{29}$FO$_2$: F, 5.93. Found: F, 5.83.

EXAMPLE 3

*6α-fluoro-17β-hydroxy-17α-methyl-4-(19-norandrosten)-3-one (6α-fluoro-17α-methyl-19-nortestosterone) and the 17-acetate thereof (compounds Iαb and XIIαb, respectively)*

Following the procedure of Example 7, parts A through E, but using 3β,17β-dihydroxy-17α-methyl-5-(19-norandrostene), compound Vb, as the starting material, there is obtained 6α-fluoro-17β-hydroxy-17α-methyl-4-(19-norandrosten)-3-one, compound Iαb, which is treated in the manner disclosed in Example 1, part F, to obtain 6α-fluoro-17β-hydroxy-17α-methyl-4-(19-norandrosten)-3-one 17-acetate, compound XIIαb.

Compound Vb used as the starting material is prepared by treating the known compound 17β-hydroxy-17α-methyl-4-(19-norandrosten)-3-one [see Djerassi et al., J. A. C. S., vol. 76, p. 4092–4 (1954)], according to the procedure disclosed in U. S. Patent 2,798,879 (note particularly Example 2) to obtain the 3-enol acetate of 17β-hydroxy-17α-methyl - 4 - (19-norandrosten)-3-one 17-acetate [3β, 17β - dihydroxy - 17α-methyl-3,5-(19-norandrostadiene) 3, 17-diacetal]. The latter compound is then subjected to treatment with sodium borohydride, followed by treatment with alkali, according to the procedure disclosed by Hartman, J. A. C. S., vol. 77, p. 5151–54 (1955) to produce 3β,17β-dihydroxy-17α-methyl-5-(19-norandrostene).

EXAMPLE 4

*6α-fluoro-17β-methyl-4-(19-norandrosten) - 3 - one (compound Iαb) directly from 6β-fluoro-5α,17β-dihydroxy-17α-methyl-19-norandrostan-3-one (compound VIIIb)*

Following the procedure of Example 1, parts A through C, but using compound Vb as the starting material, there is obtained 6β-fluoro-5α,17β-dihydroxy - 17α - methyl-19-norandrostan-3-one, compound VIIIb, which is treated with anhydrous hydrogen chloride in the manner disclosed in Example 2 to obtain 6α-fluoro-17β-hydroxy-17α-methyl-4-(19-norandrosten)-3-one, compound Iαb.

EXAMPLE 5

A. *3β,17β-dihydroxy-17α-ethinyl-5α,6α-epoxyandrostane (compound VIc)*

To a solution of 0.80 gram of 3β,17β-dihydroxy-17α-ethinyl-5-androstene dissolved in eighty milliliters of chloroform there was added 0.10 gram of anhydrous sodium acetate. The mixture was stirred for one hour and then cooled to about eight degrees centigrade. There was then added 0.72 milliliter (5.5 millimoles) of a forty percent peracetic acid solution. The reaction mixture was stirred for five minutes following the addition of the peracetic acid and then allowed to stand for sixteen hours at five degrees centigrade. Titration of the reaction mixture showed that 1.1 equivalents of the peracetic acid added had been consumed. The chloroform layer which had separated was washed with sodium sulfite, dilute alkali and water, dried and concentrated to give 0.65 gram of a product melting at 215–220 degrees centigrade. Recrystallization of the product, obtained in the concentration step, from acetone-Skellysolve B hexanes gave 0.25 gram of 3β,17β-dihydroxy-17α-ethinyl - 5α,6α - epoxyandrostane; melting point 235–237 degrees centigrade, ν$_{max}^{Nujol}$ 3530, 3360, 3220 and 2100 cm.$^{-1}$.

*Analysis.*—Calcd. for C$_{21}$H$_{30}$O$_3$: C, 76.32; H, 9.15. Found: C, 76.29; H, 9.15.

B. *6β-fluoro-3β,5α-17β-trihydroxy-17α-ethinylandrostane (compound VIIc)*

2.5 grams of anhydrous hydrogen fluoride was condensed in a 100-milliliter polyethylene bottle using a Dry Ice-acetone cooling bath. Fifteen milliliters of pre-cooled chloroform was then added, followed by the cautious addition of five milliliters of tetrahydrofuran. To this cold solution there was then added 1.8 grams of compound VIc. The thus-obtained reaction mixture was kept at about minus fifteen degrees centigrade for one hour and then warmed to five degrees centigrade, at which temperature it was held for one hour. The reaction mixture was poured into ice water, containing excess sodium bicarbonate, forming an aqueous layer and an organic layer containing a crystalline solid. The organic layer was separated and diluted with chloroform and the crystals in the organic chloroformic layer were isolated. The crystals thus obtained were washed and dried to give 0.65 gram of 6β-fluoro-3β,5α,17β-trihydroxy - 17α - ethinylandrostane, compound VIIc, melting at 244 degrees centigrade with decomposition.

*Analysis.*—Calcd. for C$_{21}$H$_{31}$FO$_3$: C, 71.96; H, 8.92; F, 5.42. Found: C, 72.37; H, 9.19; F, 4.43.

C. *6β-fluoro-5α,17β-dihydroxy-17α-ethinylandrostan-3-one (compound VIIIc)*

To a solution of 0.55 gram of compound VIIc in three milliliters of pyridine there was added a slurry containing 0.55 gram of chromic anhydride in eight milliliters of pyridine. The reaction was stirred overnight at room temperature and then the pyridine was blown off under a stream of nitrogen. The residue thus obtained was slurried with brine and extracted with ethyl acetate. The ethyl acetate solution was washed with brine and water and then dried. The ethyl acetate was removed leaving a solid residue which was recrystallized from acetone-ether to yield 100 milligrams of 6β-fluoro-5α,17β-dihydroxy-17α-ethinyl-androstan-3-one, compound VIIIc, melting at 258–259 degrees centigrade with decomposition. Infrared analysis showed OH bands at 3620 and 3410 cm.$^{-1}$, ≡C—H at 3300 cm.$^{-1}$, C≡C at 2120 cm.$^{-1}$, and C=O at 1700 cm.$^{-1}$.

D. *6α - fluoro-17β-hydroxy-17α-ethinyl-4-androsten-3-one (6α-fluoro-17-ethinyltestosterone) (compound Iαc) and 6β-fluoro-17β-hydroxy-17α-ethinyl-4-androsten-3-one (6β-fluoro-17-ethinyltestosterone) (compound Iβc)*

A solution containing 150 milligrams of compound VIIIc, eight milliliters of chloroform and 0.5 milliliter of absolute ethanol, cooled in an ice-salt bath, was saturated with gaseous hydrogen chloride. After a half-hour nitrogen was bubbled through the solution to remove some of the hydrogen chloride. The solution was washed three times with water, dried and the chloroform removed by evaporation. The residue remaining was taken up in methylene chloride and poured onto a 45-gram magnesium silicate (Florisil) column packed wet with Skellysolve B hexanes. The column was then washed with increasing amounts of acetone in Skellysolve B hexanes. The eluates were collected in 100-milliliter fractions. Fractions 11, 12 and 13 were crystallized following elution with eight percent acetone in Skellysolve B hexanes. Recrystallization from acetone-Skellysolve B hexanes gave 10.8 milligrams of 6β-fluoro-17β-hydroxy-17α-ethinyl-4-androsten-3-one, compound Iβc; melting point 245–247 degrees centigrade with decomposition, $\lambda_{max}^{alc.}$ 234 mμ, [α]$_D$ minus 57 degrees (CHCl$_3$).

Fraction 14 was a mixture of compounds Iαc and Iβc.

Fractions 15–21 were crystallized following elution with eight to ten percent acetone in Skellysolve B hexanes. Recrystallization from acetone gave 62 milligrams of 6α-fluoro-17β-hydroxy-17α-ethinyl-4-androsten-3-one, compound Iαc; melting point 237–239 degrees centigrade, $\lambda_{max}^{alc.}$ 236 mμ, $a_M$ 14,675, [α]$_D$ plus thirty degrees (CHCl$_3$).

*Analysis.*—Calcd. for C$_{21}$H$_{27}$FO$_2$: C, 76.23; H, 8.24; F, 5.75. Found: C, 76.41; H, 8.34; F, 4.88.

E. *6β-fluoro-17β-hydroxy-17α-ethinyl-4-androsten-3-one (compound Iβc)*

By treating compound VIIIc according to the procedure disclosed in Example 1, part D, there is obtained 6β-fluoro-17β-hydroxy-17α-ethinyl-4-androsten-3-one (compound Iβc).

F. *6α-fluoro-17β-hydroxy-17α-ethinyl-4-androsten-3-one (compound Iαc)*

By treating compound Iβc according to the procedure disclosed in Example 1, part E, there is obtained 6α-fluoro-17β-hydroxy-17α-ethinyl-4-androsten-3-one (compound Iαc).

G. *6α-fluoro-17β-hydroxy-17α-ethinyl-4-androsten-3-one 17-acetate (6α-fluoro-17-ethinyltestosterone acetate) (compound XIIαc)*

By treating Iαc according to the procedure disclosed in Example 1, part F, there is obtained 6α-fluoro-17β-hydroxy-17α-ethinyl-4-androsten-3-one 17-acetate.

In like manner, other 17-acylates of compound Iαc are produced by reaction with the appropriate hydrocarbon carboxylic acid anhydrides, following the procedure disclosed in Example 1, part F.

Similarly, compound Iβc is allowed to react with acetic anhydride to obtain 6β-fluoro-17β-hydroxy-17α-ethinyl-4-androsten-3-one 17-acetate, compound XIIβc, which is then converted to compound XIIαc, using the procedure set forth in Example 1, part E.

Substituting a stoichiometric equivalent of 3β,17β-dihydroxy-17α-methylethinyl-5-androstene as the starting material and following the procedure of Example 5, parts A through D, there is obtained 6α-fluoro-17β-hydroxy-17α-methylethinyl-4-androsten-3-one and 6β-fluoro-17β-hydroxy-17α-methylethinyl-4-androsten-3-one. Alternatively, by following the procedure of Example 5, parts A through C, and treating the compound thus obtained, 6β-fluoro-5α,17β-dihydroxy-17α-methylethinylandrostan-3-one, according to the procedure disclosed in Example 1, part D, there is produced 6β-fluoro-17β-hydroxy-17α-methylethinyl-4-androsten-3-one. The latter compound is then converted to 6α-fluoro-17β-hydroxy-17α-methylethinyl-4-androsten-3-one by following the procedure of Example 1, part E. 6α-fluoro-17β-hydroxy-17α-methylethinyl-4-androsten-3-one is then converted to the 17-acetate thereof by following the procedure of Example 1, part F.

The starting compound, 3β,17β-dihydroxy-17α-methylethinyl-5-androstene, is prepared from 3β-hydroxy-5-androsten-17-one (dehydroepiandrosterone) by substituting methyl acetylene for acetylene in the procedure disclosed by Ruzicka et al., Helv. Chim. Acta, vol. 20, p. 1280 (1937).

EXAMPLE 6

*6α-fluoro-17β-hydroxy-17α-ethinyl-4-androsten-3-one (compound Iαc) directly from 6β-fluoro-5α,17β-dihydroxy-17α-ethinylandrostan-3-one (compound VIIIc)*

The procedure of Example 5, parts A through C, is followed to produce compound VIIIc. By treating compound VIIIc according to the procedure disclosed in Example 2 there is produced 6α-fluoro-17β-hydroxy-17α-ethinyl-4-androsten-3-one (compound Iαc).

EXAMPLE 7

*6α-fluoro-17β-hydroxy-17α-ethinyl-4-(19-norandrosten)-3-one (6α-fluoro-17α-ethinyl-19-nortestosterone) and the 17-acetate thereof (compounds Iαd and XIIαd, respectively)*

Following the procedure of Example 5, parts A through D (or Example 5, parts A through C, followed by the procedure of Example 1, parts D and E), but using 3β,17β-dihydroxy-17α-ethinyl-5-(19-norandrostene), compound Vd, as the starting material, there is obtained 6α-fluoro-17β-hydroxy-17α-ethinyl-4-(19-norandrosten)-3-one, compound Iαd, which is treated in the manner disclosed in Example 1, part F, to obtain 6α-fluoro-17β-hydroxy-17α-ethinyl-4-(19-norandrosten)-3-one 17-acetate, compound XIIαd.

Compound Vd used as the starting material is prepared by treating the known compound 17β-hydroxy-17α-ethinyl-4-(19-norandrosten)-3-one (see U. S. Patent 2,702,811, noting particularly Example 3), according to the procedure disclosed in U. S. Patent 2,798,879 (note particularly Example 2) to obtain the 3-enol acetate of 17β-hydroxy-17α-ethinyl-4-(19-norandrosten)-3-one 17-acetate [3β,17β-dihydroxy-17α-ethinyl-3,5-(19-norandrostadiene)-3,17-diacetate]. The latter compound is then subjected to treatment with sodium borohydride, followed by treatment with alkali, according to the procedure disclosed by Hartman, J. A. C. S., vol. 77, p. 5151–54 (1955) to produce 3β,17β-dihydroxy-17α-ethinyl-5-(19-norandrostene).

Substituting a stoichiometric equivalent of 3β,17β-dihydroxy-17α-methylethinyl-5-(19-norandrostene) as the starting material and following the procedure of Example 5, parts A through D, there is obtained 6α-fluoro-17β- hydroxy - 17α - methylethinyl - 4 - (19 - norandrosten) - 3-one and 6β-fluoro-17β-hydroxy-17α-methylethinyl-4-(19-norandrosten)-3-one. Alternatively, by following the procedure of Example 5, parts A through C, and treating the compound thus obtained, 6β-fluoro-5α,17β-dihydroxy-17α-methylethinyl-19-norandrostan-3-one, according to the procedure disclosed in Example 1, part D, there is produced 6β-fluoro-17β-hydroxy-17α-methylethinyl-4-(19-norandrosten)-3-one. The latter compound is then converted to 6α-fluoro-17β-hydroxy-17α-methylethinyl-4-(19-norandrosten)-3-one by following the procedure of Example 1, part E. 6α-fluoro-17β-hydroxy-17α-methylethinyl-4-(19-norandrosten)-3-one is then converted to the 17-acetate thereof by following the procedure of Example 1, part F.

The starting compound, 3β,17β-dihydroxy-17α-methylethinyl-5-(19-norandrostene) is prepared in the following manner: a stoichiometric equivalent amount of methylacetylene, in place of acetylene, is allowed to react with 19-norandrostenedione according to the procedure disclosed in U. S. Patent 2,744,122, to produce the progestational compound 17β-hydroxy-17α-methylethinyl-4-(19-norandrosten)-3-one. The latter compound is treated according to the procedure disclosed in U. S. Patent 2,798,879 (note particularly Example 2) to obtain the 3-enol acetate of 17β-hydroxy-17α-methylethinyl-4-(19-norandrosten)-3-one 17-acetate which is then subjected to treatment with sodium borohydride, followed by treatment with alkali, according to the procedure disclosed by Hartman, J. A. C. S., vol. 77, p. 5151–54 (1955) to produce 3β,17β-dihydroxy-17α-methylethinyl-5-(19-norandrostene).

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. 6-fluoro-17β-hydroxy-17α-alkyl-4-androsten-3-ones of the following formula:

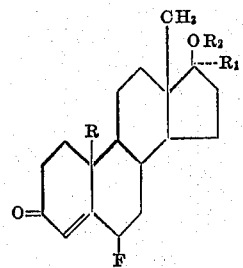

wherein R is selected from the group consisting of methyl and hydrogen, $R_1$ is an alkyl radical containing from one to six carbon atoms, inclusive, and $R_2$ is selected from the group consisting of hydrogen and the acyl radical of a hydrocarbon carboxylic acid containing from one to twelve carbon atoms, inclusive.

2. 6-fluoro-17β-hydroxy-17α-alkyl-4-androsten-3-one in which the alkyl radical contains from one to six carbon atoms, inclusive.

3. 6-fluoro-17β-hydroxy-17α-alkyl-4-androsten-3-one 17-acylates in which the alkyl radical contains from one to six carbon atoms, inclusive, and the acyl radical is that of a hydrocarbon carboxylic acid containing from one to twelve carbon atoms, inclusive.

4. 6-fluoro-17β-hydroxy-17α-methyl-4-androsten-3-one.

5. 6-fluoro-17β-hydroxy-17α-methyl-4-androsten-3-one 17-acetate.

6. 6-fluoro-17β-hydroxy-17α-ethyl-4-androsten-3-one.

7. 6-fluoro17β-hydroxy-17α-ethyl-4-androsten-3-one 17-acetate.

8. 6α-fluoro-17β-hydroxy-17α-methyl-4-androsten-3-one.

9. 6α-fluoro-17β-hydroxy-17α-methyl-4-androsten-3-one 17-acetate.

10. 6β-fluoro-17β-hydroxy-17α-methyl-4 - androsten - 3-one.

11. 6β-fluoro-17β-hydroxy-17α-methyl-4 - androsten - 3-one 17-acetate.

12. 3-oxygenated-6-fluoro-5,17β-dihydroxy-17α - alkylandrostanes of the following formula:

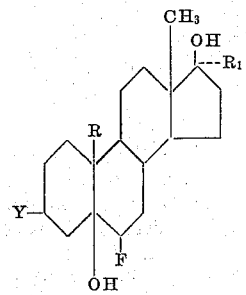

wherein R is selected from the group consisting of methyl and hydrogen, $R_1$ is an alkyl radical containing from one to six carbon atoms, inclusive, and Y is selected from the group consisting of hydroxy and keto.

13. 6β-fluoro-3β,5α,17β-trihydroxy-17α-alkylandrostane in which the alkyl radical contains from one to six carbon atoms, inclusive.

14. 6β-fluoro-3β,5α,17β-trihydroxy-17α - methylandrostane.

15. 6β-fluoro-3β,5α,17β-trihydroxy-17α-ethylandrostane.

16. 6β-fluoro-5α,17β-dihydroxy-17α-alkylandrostan - 3-one in which the alkyl radical contains from one to six carbon atoms, inclusive.

17. 6β-fluoro-5α,17β-dihydroxy-17α-methylandrosten-3-one.

18. 6β-fluoro-5α,17β-dihydroxy-17α-ethylandrostan - 3-one.

19. 6-fluoro-17β-hydroxy-17α-alkynyl-4 - androsten - 3-ones of the following formula:

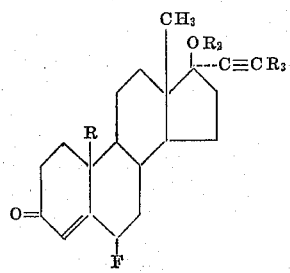

wherein R is selected from the group consisting of methyl and hydrogen, $R_2$ is selected from the group consisting of hydrogen and the acyl radical of a hydrocarbon carboxylic acid containing from one to twelve carbon atoms, inclusive, and $R_3$ is selected from the group consisting of hydrogen and an alkyl radical containing from one to four carbon atoms, inclusive.

20. 6-fluoro-17β-hydroxy-17α-ethinyl-4-androsten-3-one.

21. 6-fluoro-17β-hydroxy-17α-ethinyl-4-androsten-3-one 17-acylates in which the acyl radical is that of a hydrocarbon carboxylic acid containing from one to twelve carbon atoms, inclusive.

22. 6α-fluoro-17β-hydroxy-17α-ethinyl-4-androsten - 3-one.

23. 6β-fluoro-17β-hydroxy-17α-ethinyl-4-androsten - 3-one.

24. 6α-fluoro-17β-hydroxy-17α-ethinyl-4-androsten-3-one 17-acetate.

25. 3-oxygenated-6-fluoro-5,17β-dihydroxy-17α-ethinyl-androstanes of the following formula:

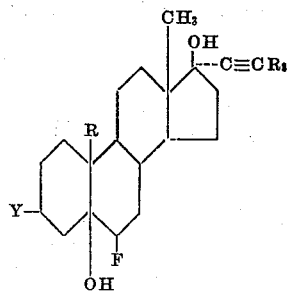

wherein R is selected from the group consisting of methyl and hydrogen, $R_3$ is selected from the group consisting of hydrogen and an alkyl radical containing from one to four carbon atoms, inclusive, and Y is selected from the group consisting of hydroxy and keto.

26. 6β-fluoro-3β,5α,17β-trihydroxy-17α-ethinylandrostane.

27. 6β-fluoro-5α,17β-dihydroxy-17α-ethinylandrostan-3-one.

28. 3β,17β-dihydroxy-17α-ethinyl-15,6-epoxyandrostanes of the following formula:

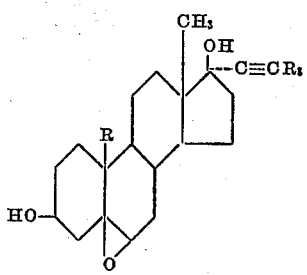

wherein R is selected from the group consisting of methyl and hydrogen, and $R_3$ is selected from the group consisting of hydrogen and an alkyl radical containing from one to four carbon atoms, inclusive.

29. 3β,17β-dihydroxy-17α-ethinyl-5α,6α-epoxyandrostane.

References Cited in the file of this patent
UNITED STATES PATENTS

| | | |
|---|---|---|
| 2,288,854 | Stavely | July 7, 1942 |
| 2,332,815 | Ruzicka | Oct. 26, 1943 |

UNITED STATES PATENT OFFICE

Certificate of Correction

Patent No. 2,838,500

June 10, 1958

J Allan Campbell et al.

It is hereby certified that error appears in the printed specification of the above numbered patent requiring correction and that the said Letters Patent should read as corrected below.

Column 9, line 62, for "procedure of Example 7" read —procedure of Example 1—; column 10, line 3, for "17-diacetal]" read —17-diacetate]—; line 10, for "-methyl-4-" read — -hydroxy-17α-methyl-4- —; column 16, lines 1 and 2, for "-15,6-epoxyandrostanes" read — -5,6-epoxyandrostanes—.

Signed and sealed this 14th day of October 1958.

[SEAL]

Attest:
KARL H. AXLINE,
*Attesting Officer.*

ROBERT C. WATSON,
*Commissioner of Patents.*

UNITED STATES PATENT OFFICE

CERTIFICATE OF CORRECTION

Patent No. 2,838,500                                                      June 10, 1958

J Allan Campbell et al.

It is hereby certified that error appears in the printed specification of the above numbered patent requiring correction and that the said Letters Patent should read as corrected below.

Column 14, line 38, for "methylandrosten" read -- methylandrostan --.

Signed and sealed this 16th day of February 1960.

(SEAL)
Attest:

KARL H. AXLINE                                        ROBERT C. WATSON
Attesting Officer                                    Commissioner of Patents

Disclaimer 2,838,500.—*J Allan Campbell*, Kalamazoo Township, Kalamazoo County, *Raymond L. Pederson*, Kalamazoo, *John C. Babcock*, Portage Township, Kalamazoo County, and *John A. Hogg*, Kalamazoo Township, Kalamazoo County, Mich. 6-FLUORO STEROIDS. Patent dated June 10, 1958. Disclaimer filed May 20, 1965, by the inventors; the assignee, *The Upjohn Company*, assenting.

Hereby enter this disclaimer to claims 20, 22, 23, 26 and 27 of said patent.
[*Official Gazette August 24, 1965.*]